US011152833B2

(12) United States Patent
Francis et al.

(10) Patent No.: US 11,152,833 B2
(45) Date of Patent: Oct. 19, 2021

(54) ELECTRICAL DEVICE HAVING COMPACT CONNECTOR ASSEMBLY SUITED FOR HIGH POWER APPLICATIONS

(71) Applicant: BorgWarner Inc., Auburn Hills, MI (US)

(72) Inventors: Philip J. Francis, Lapeer, MI (US); Keith D. Vanmaanen, Bloomfield Hills, MI (US); Branden L. Reeves, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 701 days.

(21) Appl. No.: 16/042,132

(22) Filed: Jul. 23, 2018

(65) Prior Publication Data

US 2020/0028403 A1   Jan. 23, 2020

(51) Int. Cl.
| | |
|---|---|
| *H02K 5/22* | (2006.01) |
| *H01R 4/18* | (2006.01) |
| *H01R 4/34* | (2006.01) |
| *H01R 4/02* | (2006.01) |
| *H01R 9/24* | (2006.01) |
| *H01R 9/22* | (2006.01) |
| *H01R 43/048* | (2006.01) |
| *H01R 43/20* | (2006.01) |

(52) U.S. Cl.
CPC ............. *H02K 5/225* (2013.01); *H01R 4/023* (2013.01); *H01R 4/029* (2013.01); *H01R 4/183* (2013.01); *H01R 4/34* (2013.01); *H01R 9/223* (2013.01); *H01R 9/24* (2013.01); *H01R 43/048* (2013.01); *H01R 43/20* (2013.01)

(58) Field of Classification Search
CPC .. H01R 13/405; H01R 13/504; H01R 13/748; H01R 4/34; H01R 2201/26; H01R 43/24; H01R 11/12; H01R 13/512; H01R 13/5202; H01R 13/521; H01R 13/5219; H01R 2105/00; H01R 4/30; H01R 13/207; H01R 13/621; H01R 13/6215; H01R 13/622; H01R 4/301; H01R 4/302; H01R 9/18
See application file for complete search history.

(56) References Cited

U.S. PATENT DOCUMENTS

| | | |
|---|---|---|
| 3,146,519 A | 9/1964 | Redwine |
| 4,679,888 A | 7/1987 | Williams |
| 4,775,339 A | 10/1988 | Sasaki et al. |

(Continued)

*Primary Examiner* — Edwin A. Leon
*Assistant Examiner* — Matthew T Dzierzynski
(74) *Attorney, Agent, or Firm* — Burris Law, PLLC (57) ABSTRACT

An electrical device with a conductor assembly having a conductor member and a nut. The conductor member has a wire cradle, a conductor body and a plurality of tab members. The wire cradle has a wire support portion and at least one crimp member extending from the wire support portion. The conductor body defines a terminal with a terminal face having a first hole formed therethrough. The wire cradle and the terminal face are disposed on opposite ends of the conductor body. Each of the tab members has a first portion, which is fixedly coupled to the conductor body, and a second portion that is coupled to the first portion and being spaced apart from the terminal. The tab members and the terminal form a cage. The nut is received in the cage and has a threaded aperture that is aligned to the first hole in the terminal face.

17 Claims, 6 Drawing Sheets

(56) References Cited

U.S. PATENT DOCUMENTS

| | | | |
|---|---|---|---|
| 5,842,594 A | 12/1998 | Ibara | |
| 6,250,975 B1 | 6/2001 | LaPointe | |
| 6,702,612 B2 * | 3/2004 | Miyazaki | H01R 13/521 |
| | | | 439/559 |
| 6,716,071 B2 * | 4/2004 | Miyazaki | H01R 13/748 |
| | | | 439/421 |
| 7,264,506 B2 * | 9/2007 | Mori | H01R 11/03 |
| | | | 439/606 |
| 7,811,116 B2 | 10/2010 | Sakakura et al. | |
| 8,545,265 B2 * | 10/2013 | Sakamoto | B29C 45/14467 |
| | | | 439/606 |
| 8,562,381 B2 * | 10/2013 | Kawamura | H01R 4/34 |
| | | | 439/801 |
| 8,790,135 B2 * | 7/2014 | Maegawa | H01R 13/521 |
| | | | 439/587 |
| 9,124,024 B2 * | 9/2015 | Itsuki | H01R 24/20 |
| 9,281,627 B2 * | 3/2016 | Fujiwara | H01R 13/6581 |
| 9,287,649 B2 * | 3/2016 | Okayasu | H01R 13/424 |
| 2003/0017391 A1 | 1/2003 | Peterson et al. | |
| 2010/0320852 A1 | 12/2010 | Isogai et al. | |

\* cited by examiner

ELECTRICAL DEVICE HAVING COMPACT CONNECTOR ASSEMBLY SUITED FOR HIGH POWER APPLICATIONS

FIELD

The present disclosure relates to an electrical device having a compact connector assembly that is suited for high power applications.

BACKGROUND

It is relatively common for high-power electrical devices to employ an external terminal block for connecting the electrical device to conductors that provide high power to operate the electrical device. When the electrical device includes an electric motor, for example, a first wiring set can be employed to electrically couple the power leads of the electric motor to a first side of the external terminal block, and the conductors providing high power to the electric motor are coupled to a second side of the external terminal block. While this configuration is suited for its intended purpose, it tends to be rather bulky and therefore can be difficult to package into an application. Additionally, the electrical connections to the terminal block adds additional cost and can be rather cumbersome due to the size and stiffness of conductors, as well as the location of the terminal block.

SUMMARY

This section provides a general summary of the disclosure, and is not a comprehensive disclosure of its full scope or all of its features.

In one form, the present disclosure provides an electrical device with a conductor assembly having a conductor member and a nut. The conductor member has a wire cradle, a conductor body and a plurality of tab members. The wire cradle, the tab members and the conductor body are unitarily and integrally formed of a single piece of an electrically conductive metal. The wire cradle is disposed longitudinally about a cradle axis and has a wire support portion and at least one crimp member extending from the wire support portion. The conductor body defines a terminal with a terminal face having a first hole formed therethrough. The wire cradle and the terminal face are disposed on opposite ends of the conductor body. Each of the tab members has a first portion, which is fixedly coupled to the conductor body, and a second portion that is coupled to the first portion and being spaced apart from the terminal. The tab members and the terminal form a cage. The nut is received in the cage and has a threaded aperture that is aligned to the first hole in the terminal face.

The wire cradle can be formed as a sleeve that is slit parallel to the cradle axis.

A wire can be received in the wire support and the at least one crimp member can be deformed against the wire to at least one of electrically and mechanically couple the wire to the wire cradle. The wire includes a conductive wire element that can optionally be bonded to the wire cradle, for example via sonic welding, or soldered to the wire cradle.

The electrical device can further include a conductor housing formed of an electrically insulating plastic material that houses the conductor housing. Optionally, the electrical device can include a wire received in the wire cradle. The at least one crimp member is deformed against the wire to at least one of electrically and mechanically couple the wire to the wire cradle. A portion of the wire is housed in the conductor housing. The wire cradle, the tab members, and the portion of the wire can optionally be encapsulated in the electrically insulating plastic material that forms the conductor housing. Also optionally, the electrical device can further include a mating conductor, a threaded fastener and a connector housing. The mating conductor has a mating terminal face with a second hole formed therethrough. The mating terminal face abuts the terminal face on the conductor assembly. The threaded fastener is received through the first and second holes and is threadably engaged to the nut. The threaded fastener cooperates with the nut to exert a clamping force that secures the terminal face and the mating terminal face to one another. The connector housing defines a connector aperture into which the conductor housing is received. The mating conductor and the threaded fastener are housed in the connector housing.

The electrical device can further include an electric motor having a plurality of power terminals. The mating conductor can be electrically coupled to one of the power terminals. Optionally, the electric motor has a stator with a plurality of windings, and the power terminals are electrically coupled to the windings.

In another form, the present disclosure provides a method for providing an electrical device. The method includes: providing a connector assembly having a conductor assembly and a wire, the conductor assembly having a conductor member and a nut, the conductor member having a wire cradle, a conductor body and a plurality of tab members, the wire cradle, the tab members and the conductor body being unitarily and integrally formed of a single piece of an electrically conductive metal, the wire cradle being disposed longitudinally about a cradle axis and having a wire support portion and at least one crimp member extending from the wire support portion, the conductor body defining a terminal with a terminal face having a first hole formed therethrough, the wire cradle and the terminal face being disposed on opposite ends of the conductor body, each of the tab members having a first portion and a second portion, the first portion being fixedly coupled to the conductor body, the second portion being coupled to the first portion and being spaced apart from the terminal, the tab members and the terminal forming a cage, the nut being received in the cage and having a threaded aperture that is aligned to the first hole in the terminal face, the wire being received in the wire cradle, the at least one crimp member being deformed against the wire to at least one of electrically and mechanically couple the wire to the wire cradle; aligning the terminal face of the conductor body to a mating terminal face on a mating conductor; and fitting a threaded fastener through both a second hole formed in the mating terminal face and the first hole in the terminal face, and threadably coupling the threaded fastener to the nut to both secure and electrically engage the terminal face and the mating terminal face to one another.

The method can optionally include housing the tab members, the wire cradle and a portion of the wire in a conductor housing formed of an electrically insulating plastic material. Optionally, the wire cradle, the tab members, and the portion of the wire are encapsulated in the electrically insulating plastic material that forms the conductor housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
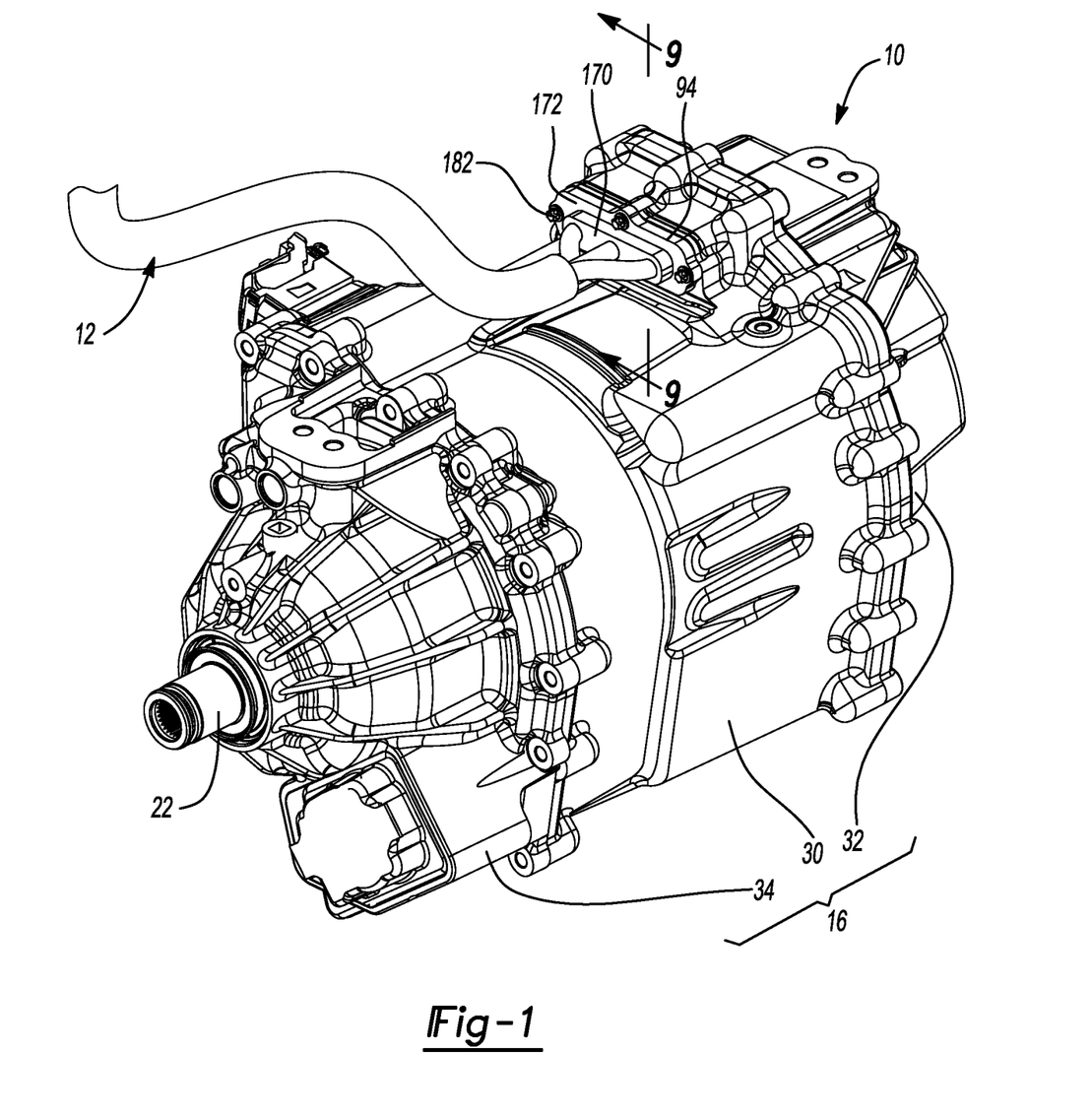
FIG. 1 is a perspective view of an exemplary electrical device constructed in accordance with the teachings of the present disclosure.
Figure 2:
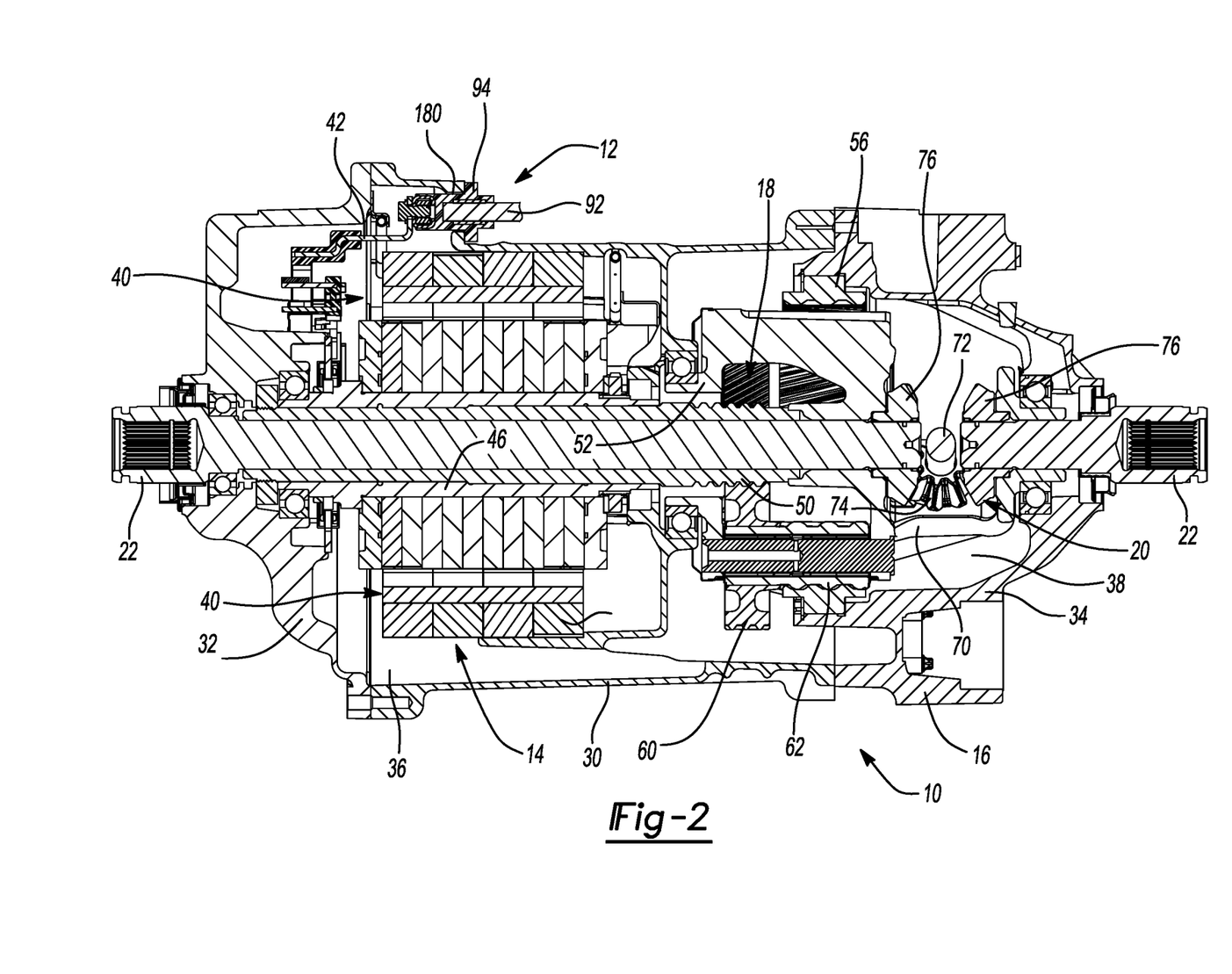
FIG. 2 is a longitudinal section view of the electrical device of FIG. 1.

With reference to FIGS. 1 and 2 of the drawings, an exemplary electrical device constructed in accordance with the teachings of the present disclosure is generally indicated by reference numeral 10. The electrical device 10 includes a connector assembly 12 that is configured to electrically couple the electrical device 10 to a source of electrical power. In the example provided, the electrical device 10 is illustrated as being an electric drive module having a high-power electric motor 14 that is received in a housing assembly 16 and employed to provide propulsive power (via a transmission 18 and a differential assembly 20) to a pair of output shafts 22, but it will be appreciated that the teachings of the present disclosure have application to various other electrical devices that may or may not include an electric motor.

The housing assembly 16 includes a main housing member 30 and first and second end caps 32 and 34, respectively. The main housing member 30 and the first end cap 32 cooperate to form a first chamber 36, while the main housing member 30 and the second end cap 34 cooperate to form a second chamber 38.

Figure 3:
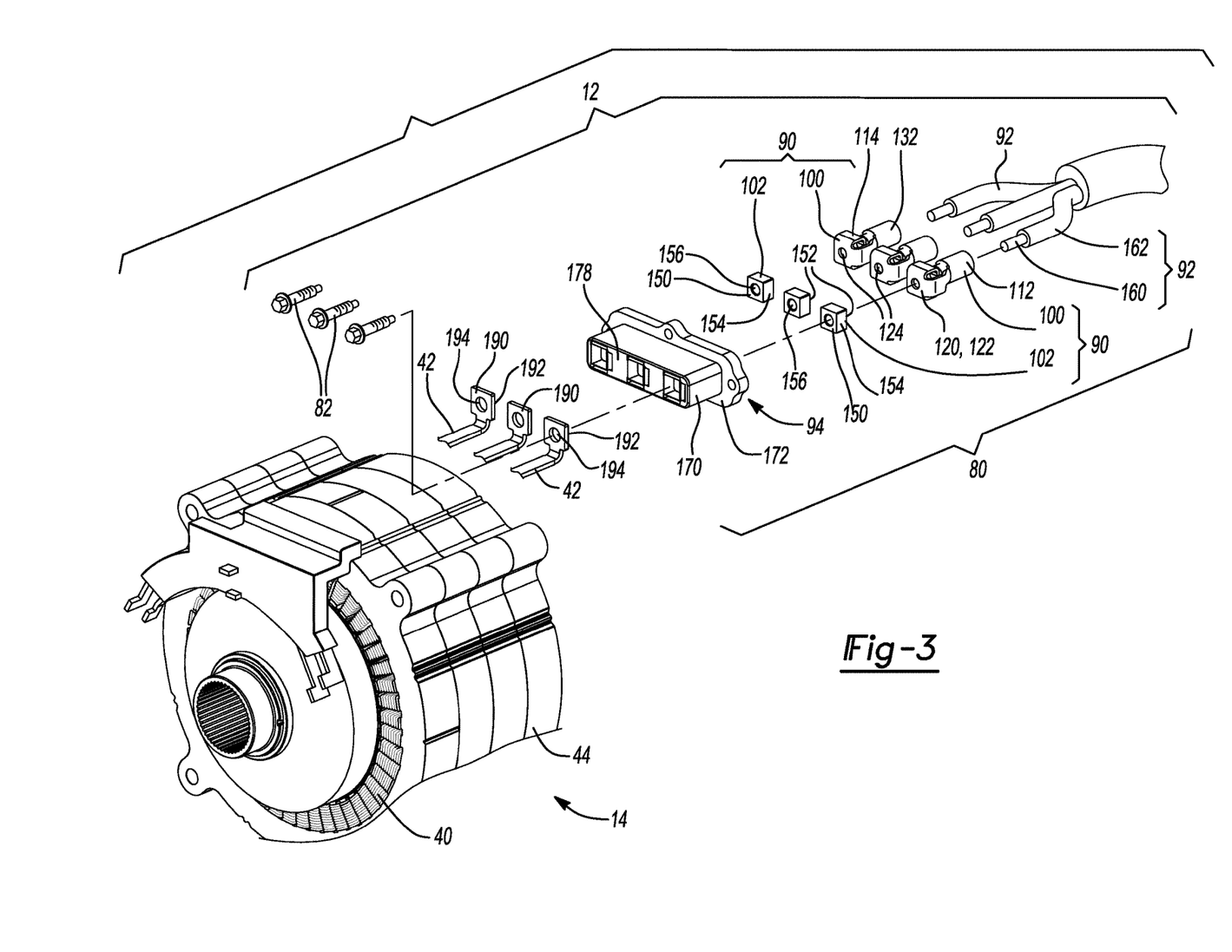
FIG. 3 is an exploded perspective view of a portion of the electrical device of FIG. 1, the view illustrating an electric motor and a connector assembly in more detail.

With reference to FIGS. 2 and 3, the electric motor 14 is received in the first chamber 36 and includes a plurality of windings 40 and a plurality of power terminals 42 that are each electrically coupled to the windings 40. In the particular example provided, the electric motor 14 is an induction motor having a stator 44 and a hollow rotor 46 and the windings 40 are wound about the stator 44. It will be appreciated that the electric motor 14 could be configured differently, and that the windings could be associated with the rotor 46.

With specific reference to FIG. 2, the transmission 18 can be configured as a planetary transmission 18 having a sun gear 50, which can be coupled to the rotor 46 of the electric motor 14 for rotation therewith, a planet carrier 52, a plurality of compound planet gears 54 journally supported by the planet carrier 52 for rotation about respective axes that are concentrically disposed about the sun gear 50, and a ring gear 56 that is non-rotatably coupled to the second end cap 34. Each of the compound planet gears 54 has a first planet gear 60, which is meshingly engaged to the sun gear 50, and a second planet gear 62 that is coupled to the first planet gear 60 for rotation therewith and meshingly engaged to the ring gear 56.

The differential assembly 20 includes a differential case 70 which is coupled to the planet carrier 52 for rotation therewith, a cross-pin 72, a plurality of differential pinions 74 (only one is shown) and a pair of side gears 76. The cross-pin 72 is coupled to the differential case 70 for rotation therewith and extends along an axis that is perpendicular to the rotational axis of the differential case 70. The differential pinions 74 are received in the differential case 70 and are journally supported by the cross-pin 72. Each of the side gears 76 is received in the differential case 70, meshed with the differential pinions 74 and coupled to a corresponding one of the output shafts 22.

With reference to FIG. 3, the connector assembly 12 can include a connector 80, the power terminals 42 and a plurality of bolts 82. The connector 80 can have one or more conductor assemblies 90, one or more cables or wires 92, and a conductor housing 94. Each of the conductor assemblies 90 can include a conductor member 100 and a nut 102.

Figure 4:
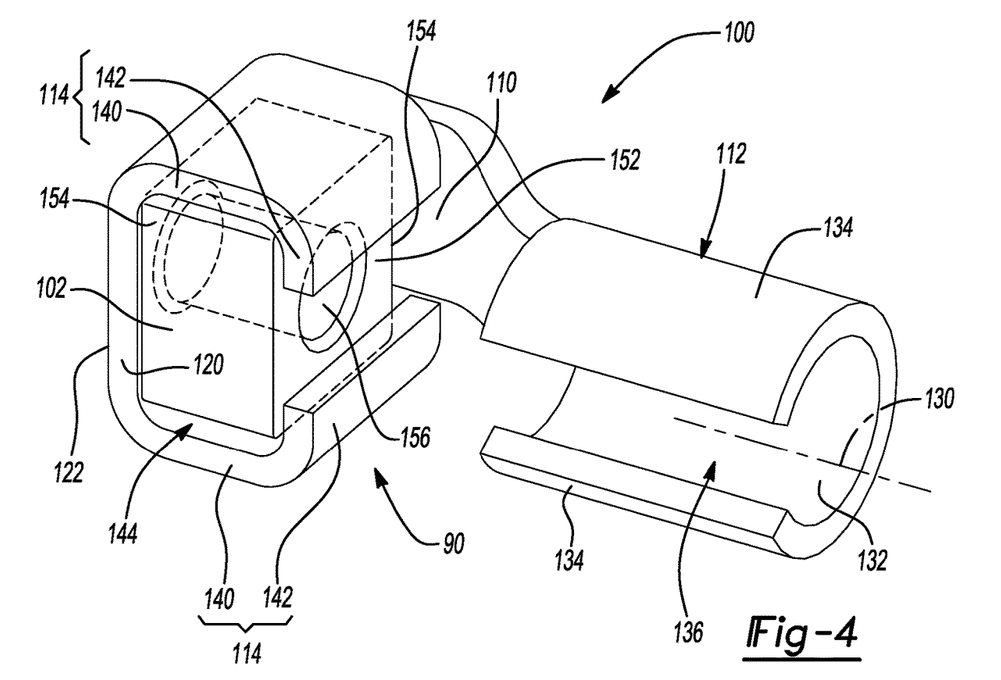
FIG. 4 is a perspective view of a portion of the connector assembly, the view illustrating a conductor assembly.
Figure 4A:
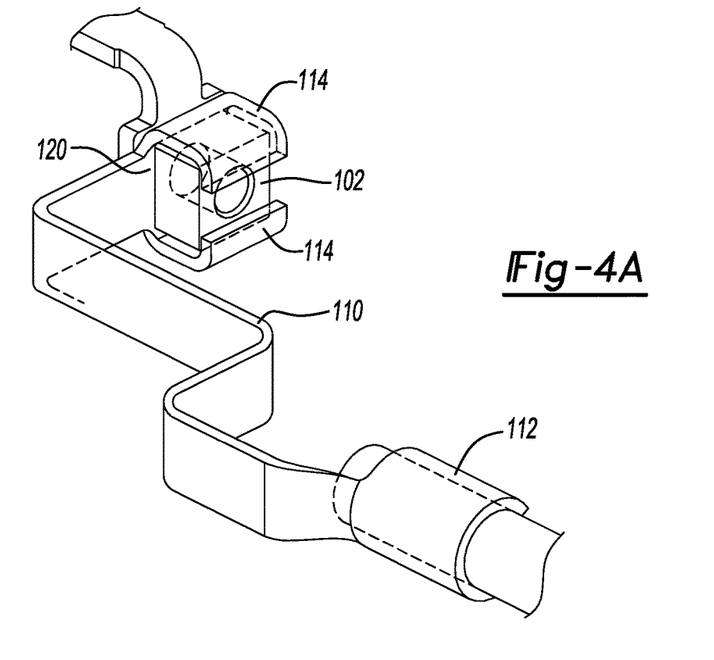
FIG. 4A is a perspective view similar to that of FIG. 4 but illustrating a connector assembly having a differently shaped conductor body.
Figure 5:
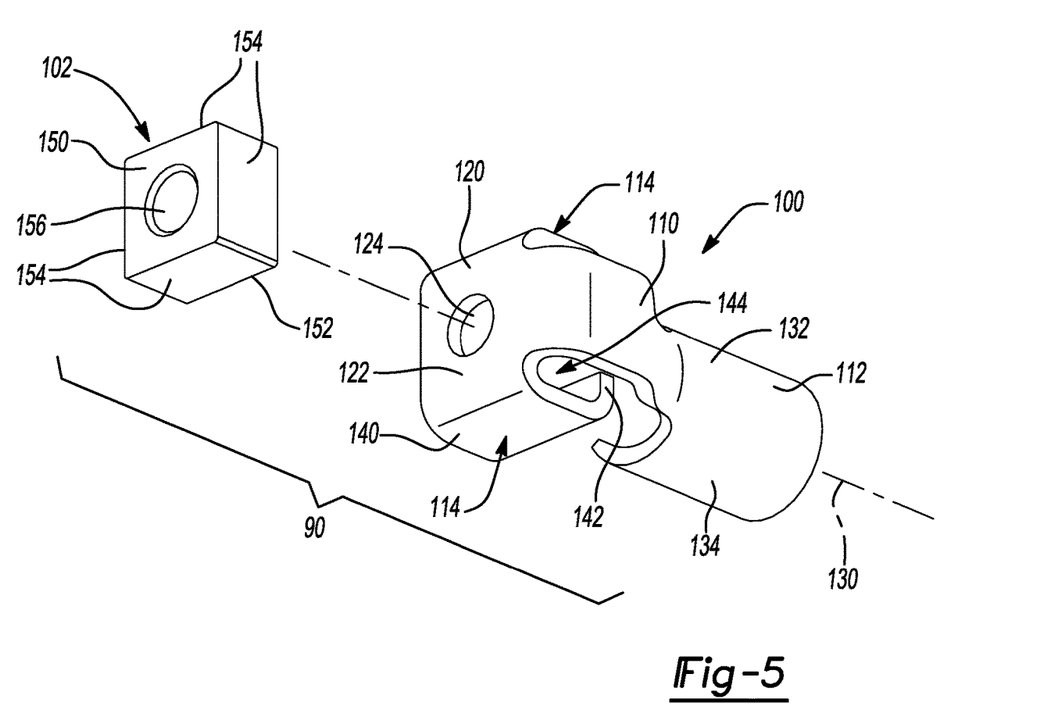
FIG. 5 is an exploded perspective view of the conductor assembly.

With reference to FIGS. 4 and 5, the conductor member 100 can be integrally and unitarily formed of a single piece of conductive sheet metal material, such as brass, copper or aluminum, and can have a conductor body 110, a wire cradle 112, and a plurality of tab members 114. The conductor body 110 can define a terminal 120 having a terminal face 122 with a first hole 124 formed therethrough. In the particular example provided, the conductor body 110 is relatively short so as to reduce the amount of space that the conductor body 110 takes up, but it will be appreciated that conductor body 110 could be shaped differently, such as is shown in FIG. 4A. The wire cradle 112 can be coupled to an end of the conductor body 110 opposite the terminal 120 and can extend along a cradle axis 130. The wire cradle 112 can include a wire support portion 132 and at least one crimp member 134 that can extend from the wire support portion 132. In the example provided, the wire cradle 112 is formed as a hollow cylindrical tube having a slit 136 formed therethrough that extends parallel to the cradle axis 130. Accordingly, the wire cradle 112 of the example provided is generally C-shaped and includes two crimp members 134 that are disposed on opposite sides of a trough-shaped wire support portion 132. Each of the tab members 114 can be generally L-shaped, having a first portion 140, which is fixedly coupled to the conductor body 110, and a second portion 142 that is coupled to a distal end of the first portion 140 and spaced apart from the terminal 120. The tab members 114 and the terminal 120 form a cage 144.

The nut 102 has a front face 150, a rear face 152, a plurality of side edges 154 and a threaded aperture 156. The nut 102 is received in the cage 144 such threaded aperture 156 is aligned to the first hole 124, the front face 150 is abutted to the terminal 120 on a side opposite the terminal face 122, two or more of the side edges 154 are abutted against the first portions 140 of the tab members 114 (to thereby inhibit relative rotation between the tab members 114 and the nut 102), another of the side edges 154 can abut the conductor body 110, and the rear face 152 is disposed adjacent the second portions 142 of the tab members 114. Accordingly, it will be appreciated that the nut 102 can be captured by the cage 144.

Figure 6:
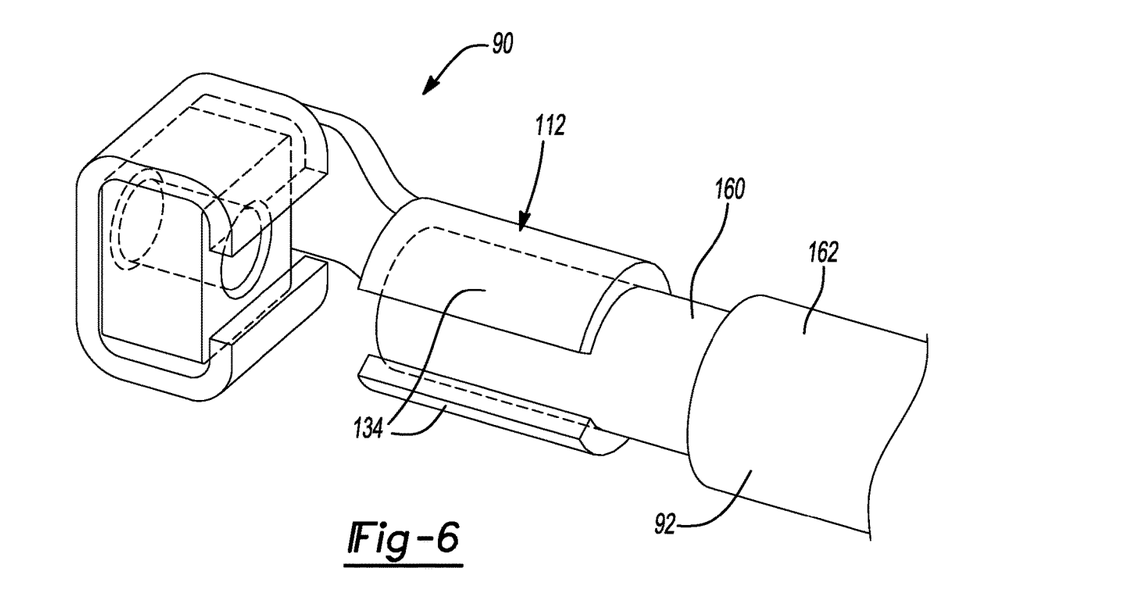
FIG. 6 is a perspective view illustrating a wire coupled to the connector assembly.

With reference to FIG. 6, each of the wires 92 can include a conductive wire element 160 and an electrically insulating sheath 162 that is disposed about the conductive wire element 160. A portion of each of the wires 92 can be disposed on the wire cradle 112 of a corresponding one of the conductor assemblies 90 and the crimp portion(s) 134 of the wire cradle 112 can be deformed to electrically and/or mechanically couple the conductive wire element 160 to the wire cradle 112. In the example provided, the electrically insulating sheath 162 is stripped from a segment of the wire 92 and is received into the hollow tubular wire cradle 112. Thereafter, the crimp portion(s) 134 of the wire cradle 112 are deformed to both electrically and mechanically couple the conductive wire element 160 to both the wire support portion 132 and the crimp portion(s) 134. It will be appreciated, however, that various other means can be employed in lieu of or in addition to the crimping of the crimp portion(s) 134 to the conductive wire element 160. For example, the conductive wire element 160 could be mechanically and/or electrically coupled to the wire cradle 112 via soldering or bonding. Sonic welding is one form of bonding that provides an extremely robust, low impedance electrical connection that permits relatively high instantaneous current flow.

Figure 7:
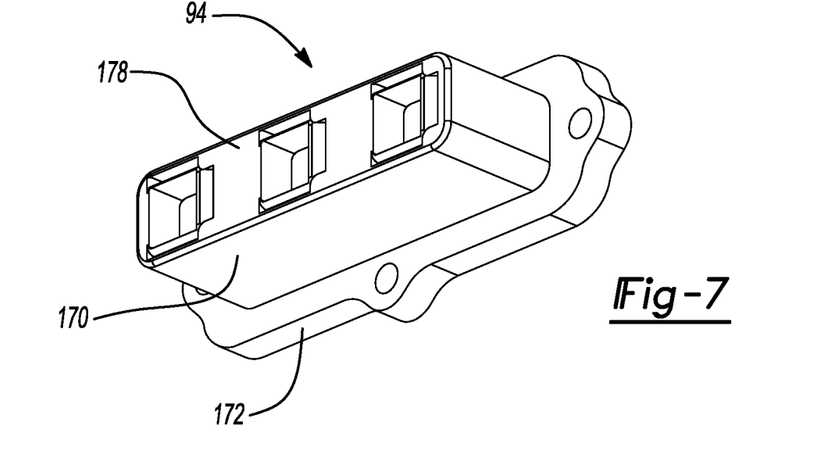
FIG. 7 is a perspective view of a portion of the connector assembly, the view illustrating a conductor housing.
Figure 8:
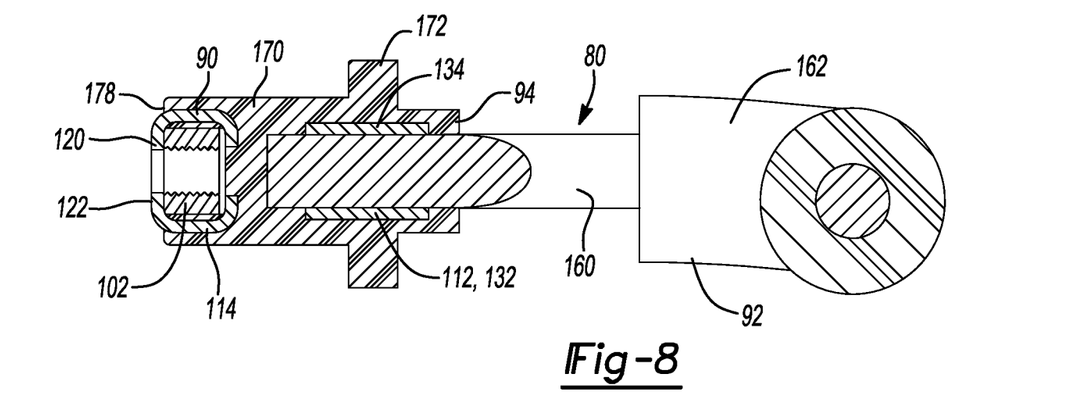
FIG. 8 is a sectional view of a portion of the connector assembly, the view illustrating a connector.
Figure 9:
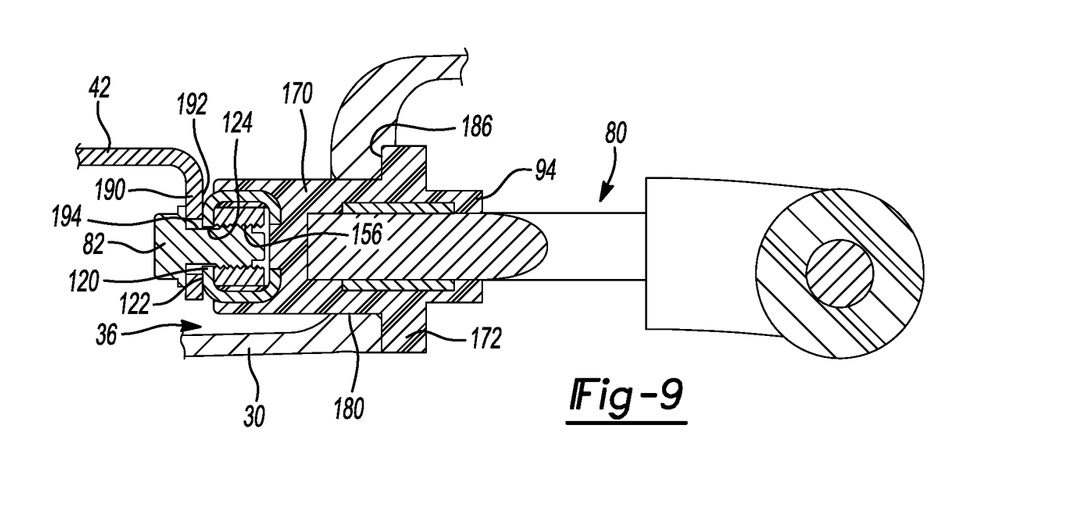
FIG. 9 is an enlarged portion of FIG. 2 illustrating the connector assembly in more detail.

With reference to FIGS. 7 and 8, the conductor housing 94 can be formed of an electrically insulating plastic material and can house the conductor assemblies 90 and the portions of the wires 92. In the particular example provided, the wire cradles 112, the tab members 114 and the portions of the wires 92 that are secured to the wire cradles 112 are encapsulated in the electrically insulating plastic material that forms the conductor housing 94. The conductor housing 94 can define a housing body 170 and a flange 172. The conductor assemblies 90 can be mounted in the housing body 170 such that the terminal faces 122 are disposed from the first flange by a predetermined dimension to thereby position the terminal faces 122 so that they project from (or are recessed within) an axial end 178 of the housing body 170 by a desired amount. With reference to FIG. 9, the housing body 170 can be received through a connector aperture 180 formed in the main housing member 30 and a plurality of threaded fasteners 82 (FIG. 1) can be received through the flange 172 and threadably engaged to threaded apertures (not specifically shown) formed in the main housing member 30 to thereby fixedly couple the conductor housing 94 to the main housing member 30. A gasket or seal (not shown) can be disposed between the flange 172 and an axial end face 186 on the main housing member 30 to inhibit the ingress of dirt, debris or moisture into the first chamber 36.

Each of the power terminals 42 can include a mating terminal 190 having a mating terminal face 192 with a second hole 194 formed therethrough. The mating terminal 190 is formed of an electrically conductive metal, such as brass, copper or aluminum. The mating terminal face 192 of each of the mating terminals 190 can be abutted against the terminal face 122 of an associated one of the terminals 120 such that the first and second holes 124 and 194 are aligned to one another. The threaded fasteners 82 can be received through the first and second holes 124 and 194 and can be threaded into the threaded apertures 156 of the nuts 102. The threaded fasteners 82 can be tightened so that each engaged pair of the threaded fasteners 82 and the nuts 102 cooperate to generate a clamping force that secures and engages the terminal face 122 to the mating terminal face 192.

With reference to FIGS. 2 and 9, it will be appreciated that the stator 44, the power terminals 42, the connector 80, and the bolts 82 can be assembled to the main housing member 30 prior to the installation of the first end cap 32 to the main housing member 30 to thereby electrically couple the windings 40 of the electric motor 14 to the wires 92.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrical device comprising:
a conductor assembly having a conductor member and a nut, the conductor member having a wire cradle, a conductor body and a plurality of tab members, the wire cradle, the tab members and the conductor body being unitarily and integrally formed of a single piece of an electrically conductive metal, the wire cradle being disposed longitudinally about a cradle axis and having a wire support portion and at least one crimp member extending from the wire support portion, the conductor body defining a terminal with a terminal face having a first hole formed therethrough, the wire cradle and the terminal face being disposed on opposite ends of the conductor body, each of the tab members having a first portion and a second portion, the first portion being fixedly coupled to the conductor body, the second portion being coupled to the first portion and being spaced apart from the terminal, the tab members and the terminal forming a cage, the nut having a threaded aperture that is aligned to the first hole in the terminal face, the nut being received in the cage such that a first axial end of the nut abuts the terminal and a second axial end of the nut that is opposite the first axial end of the nut abuts the second portions, wherein the first portions cooperate to inhibit relative rotation between the nut and the terminal, and wherein the second portions cooperate to limit movement of the nut in a direction away from the terminal face.

2. The electrical device of claim 1, wherein the wire cradle is formed as a sleeve that is slit parallel to the cradle axis.

3. The electrical device of claim 1, further comprising a wire received in the wire support portion and wherein the at least one crimp member is deformed against the wire to at least one of electrically and mechanically couple the wire to the wire cradle.

4. The electrical device of claim 3, wherein the wire includes a conductive wire element that is bonded to the wire cradle.

5. The electrical device of claim 4, wherein the wire element is sonically welded to the wire cradle.

6. The electrical device of claim 3, wherein the wire includes a conductive wire element that is soldered to the wire cradle.

7. The electrical device of claim 1, further comprising a conductor housing formed of an electrically insulating plastic material, the conductor assembly being housed in the conductor housing.

8. The electrical device of claim 7, further comprising a wire received in the wire cradle, wherein the at least one crimp member is deformed against the wire to at least one of electrically and mechanically couple the wire to the wire cradle, and wherein a portion of the wire is housed in the conductor housing.

9. The electrical device of claim 8, wherein the wire cradle, the tab members, and the portion of the wire are encapsulated in the electrically insulating plastic material that forms the conductor housing.

10. The electrical device of claim 8, further comprising a mating terminal and a threaded fastener, the mating terminal having a mating terminal face with a second hole formed therethrough, the mating terminal face abutting the terminal face on the conductor assembly, the threaded fastener being received through the first and second holes and being threadably engaged to the nut, the threaded fastener cooperating with the nut to exert a clamping force that secures the terminal face and the mating terminal face to one another.

11. The electrical device of claim 7, further comprising a mating terminal and a threaded fastener, the mating terminal having a mating terminal face with a second hole formed therethrough, the mating terminal face abutting the terminal face on the conductor assembly, the threaded fastener being received through the first and second holes and being threadably engaged to the nut, the threaded fastener cooperating with the nut to exert a clamping force that secures the terminal face and the mating terminal face to one another.

12. The electrical device of claim 11, further comprising an electric motor having a plurality of power terminals, and wherein the mating terminal is electrically coupled to one of the power terminals.

13. The electrical device of claim 12, wherein the electric motor has a stator with a plurality of windings and wherein the power terminals are electrically coupled to the windings.

14. The electrical device of claim 1, wherein the first hole in the terminal face is concentrically disposed about the cradle axis.

15. A method for providing an electrical device, the method comprising:
providing a connector assembly having a conductor assembly and a wire, the conductor assembly having a conductor member and a nut, the conductor member having a wire cradle, a conductor body and a plurality of tab members, the wire cradle, the tab members and the conductor body being unitarily and integrally formed of a single piece of an electrically conductive metal, the wire cradle being disposed longitudinally about a cradle axis and having a wire support portion and at least one crimp member extending from the wire support portion, the conductor body defining a terminal with a terminal face having a first hole formed therethrough, the wire cradle and the terminal face being disposed on opposite ends of the conductor body, each of the tab members having a first portion and a second portion, the first portion being fixedly coupled to the conductor body, the second portion being coupled to the first portion and being spaced apart from the terminal, the tab members and the terminal forming a cage, the nut having a threaded aperture that is aligned to the first hole in the terminal face, the nut being received in the cage such that a first axial end of the nut abuts the terminal and a second axial end of the nut that is opposite the first axial end of the nut abuts the second portions, wherein the first portions cooperate to inhibit relative rotation between the nut and the terminal, and wherein the second portions cooperate to limit movement of the nut in a direction away from the terminal face, the wire being received in the wire cradle, the at least one crimp member being deformed against the wire to at least one of electrically and mechanically couple the wire to the wire cradle;
aligning the terminal face of the conductor body to a mating terminal face on a mating conductor; and
fitting a threaded fastener through both a second hole formed in the mating terminal face and the first hole in the terminal face, and threadably coupling the threaded fastener to the nut to both secure and electrically engage the terminal face and the mating terminal face to one another.

16. The method of claim 15, further comprising housing the tab members, the wire cradle, and a portion of the wire in a conductor housing formed of an electrically insulating plastic material.

17. The method of claim 16, wherein the wire cradle, the tab members, and the portion of the wire are encapsulated in the electrically insulating plastic material that forms the conductor housing.

* * * * *